(12) United States Patent
Tones

(10) Patent No.: US 9,328,825 B2
(45) Date of Patent: May 3, 2016

(54) ANTI-EXTRUSION CONE PACKING

(71) Applicant: Garlock Sealing Technologies, Palmyra, NY (US)

(72) Inventor: Christopher E. Tones, Palmyra, NY (US)

(73) Assignee: GARLOCK SEALING TECHNOLOGIES, LLC, Palmyra, NY (US)

(*) Notice: Subject to any disclaimer, the term of this patent is extended or adjusted under 35 U.S.C. 154(b) by 162 days.

(21) Appl. No.: 14/014,228

(22) Filed: Aug. 29, 2013

(65) Prior Publication Data

US 2015/0061226 A1 Mar. 5, 2015

(51) Int. Cl.
*F16J 15/32* (2006.01)
*F16J 15/24* (2006.01)
*F16J 15/18* (2006.01)
*B29D 99/00* (2010.01)

(52) U.S. Cl.
CPC .............. *F16J 15/24* (2013.01); *B29D 99/0053* (2013.01); *F16J 15/181* (2013.01)

(58) Field of Classification Search
CPC .......... F16J 15/18; F16J 15/184; F16J 15/189
See application file for complete search history.

(56) References Cited

U.S. PATENT DOCUMENTS

| | | | |
|---|---|---|---|
| 3,002,776 A * | 10/1961 | Tschappat | 277/329 |
| 3,084,946 A * | 4/1963 | Sharp | 277/532 |
| 4,138,144 A * | 2/1979 | Pierce, Jr. | 285/18 |
| 4,379,558 A * | 4/1983 | Pippert | 277/584 |
| 4,560,176 A * | 12/1985 | Hoff | 277/505 |
| 7,055,593 B2 * | 6/2006 | Lappin | 166/84.1 |
| 8,631,861 B1 * | 1/2014 | Busch | 166/84.4 |

* cited by examiner

*Primary Examiner* — Gilbert Lee
(74) *Attorney, Agent, or Firm* — Perkins Coie LLP

(57) ABSTRACT

An improved shaft assembly with a rigid component for facilitating sealing is disclosed. The shaft assembly includes a housing, a cap connected to the housing, a shaft operably positioned in the housing, first and second sealing elements, and the rigid component fixedly attached to the first sealing component. The first and second sealing components are in contact with the housing and the shaft. The rigid component is in contact with the first sealing component and the cap, so as to prevent the first sealing component from extruding outside the cap when the shaft reciprocally moves relative to the housing.

20 Claims, 6 Drawing Sheets

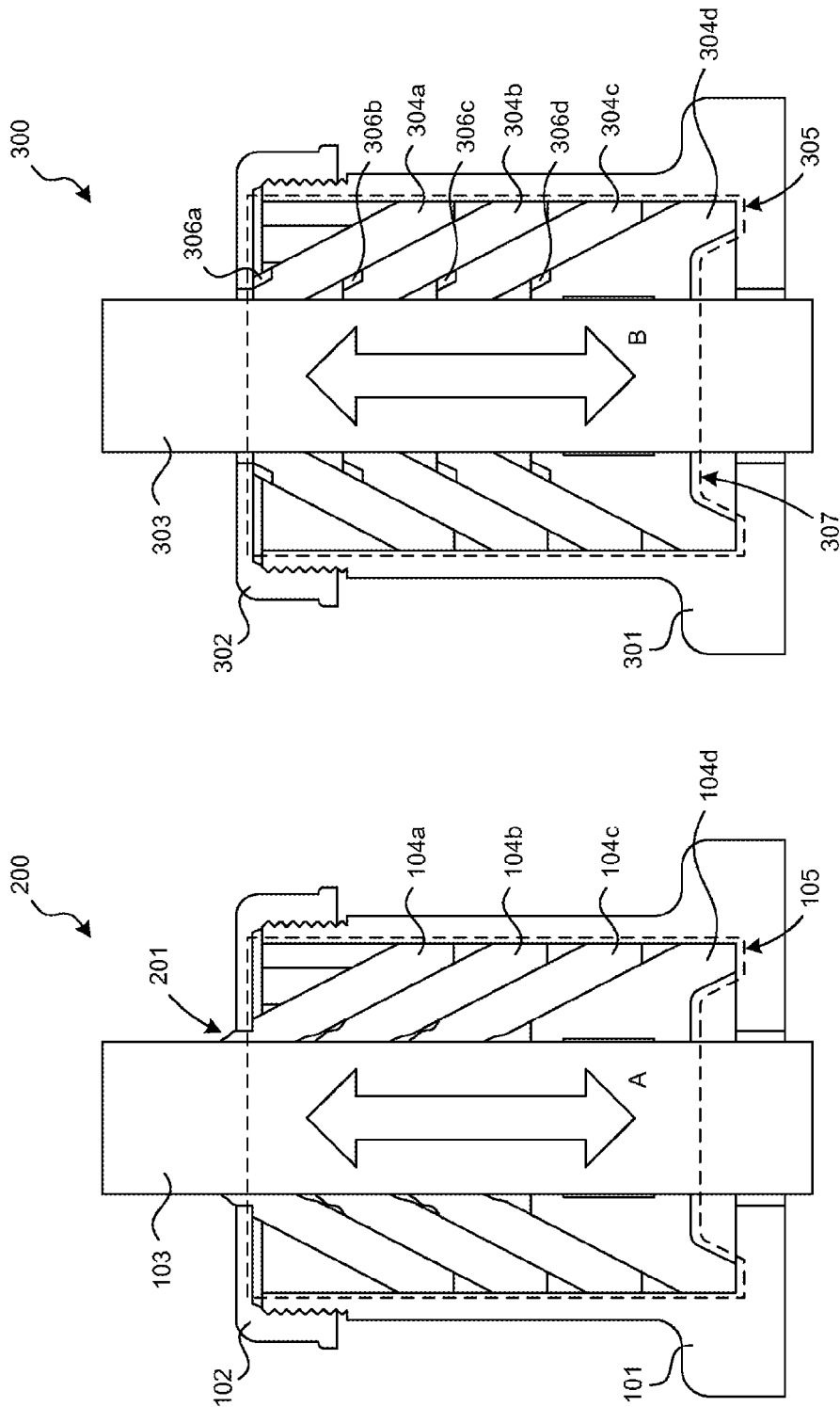

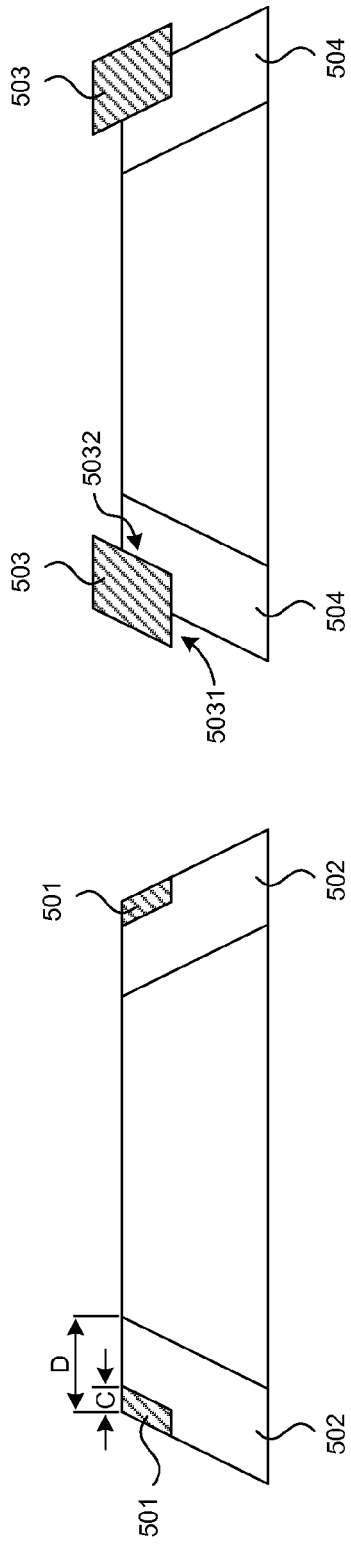
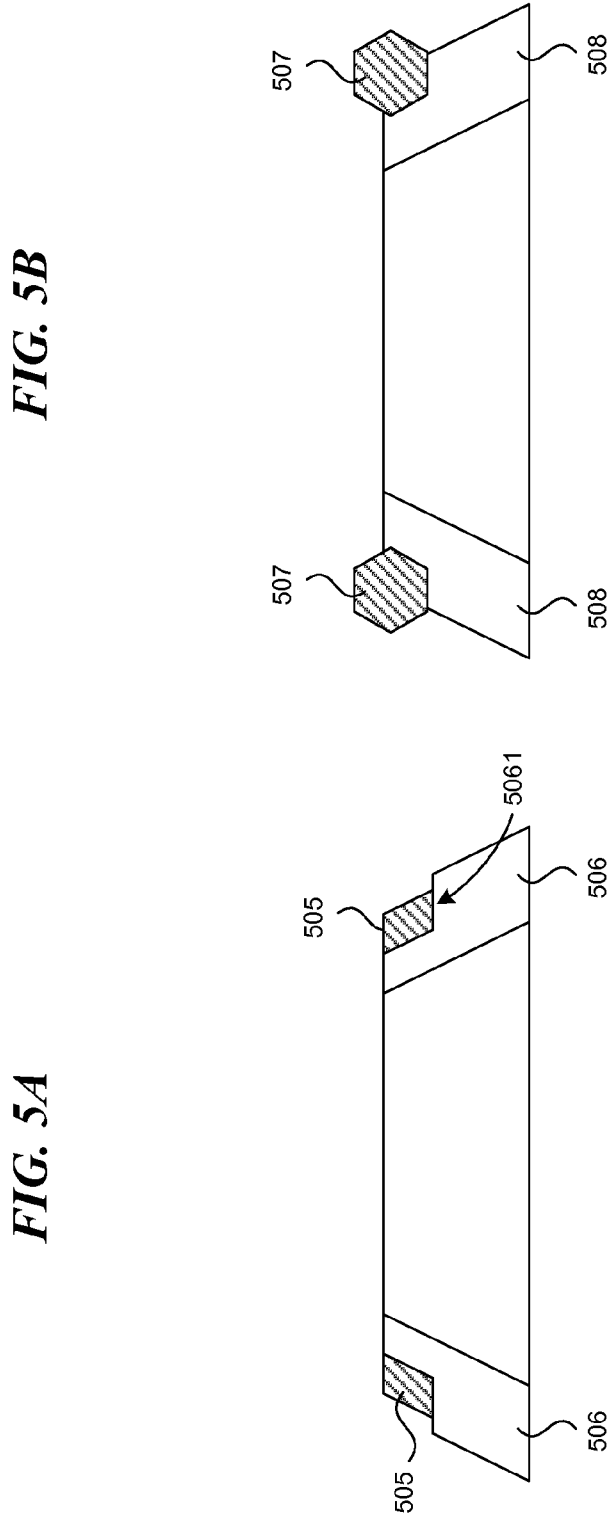
FIG. 5A
FIG. 5B
FIG. 5C
FIG. 5D

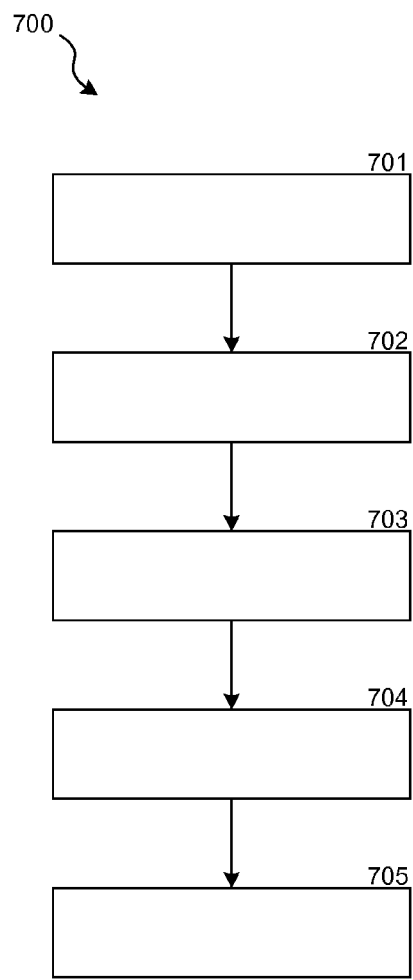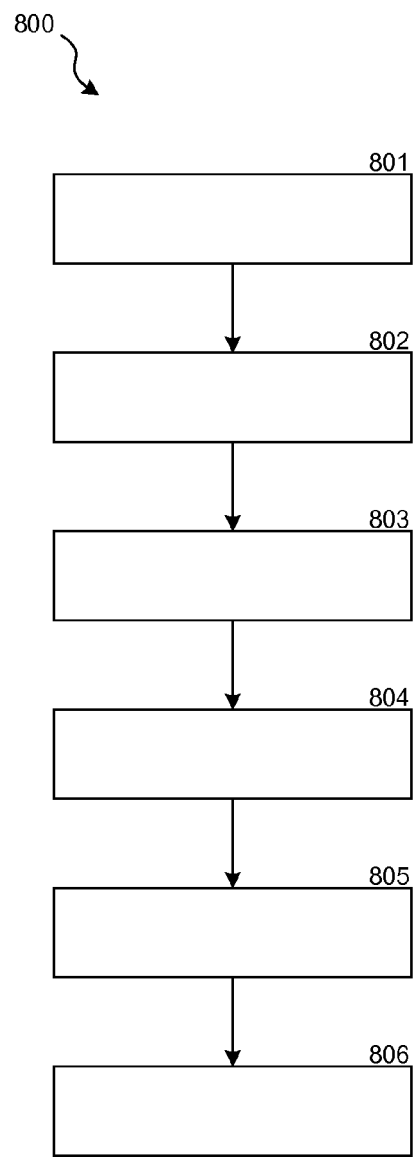
*FIG. 7*
*FIG. 8*

ANTI-EXTRUSION CONE PACKING

CROSS-REFERENCE TO RELATED PATENT APPLICATIONS

None

BACKGROUND

Shaft assemblies, such as plunger assemblies, are widely used in valve or pump systems. Shafts or plungers in these systems can be moved reciprocally. It is important to properly seal the shaft or plunger assemblies to have satisfactory performance without excessive leakage.

Conventionally, the shaft or plunger assemblies can be sealed by cone packing components or materials. As shown in FIG. 1, a plunger assembly 100 includes a housing 101, a cap 102, a plunger 103, and four cone packing components 104a, 104b, 104c, and 104d. The plunger 103 is positioned within the housing 101. The cone packing components 104a-d are positioned to surround the plunger 103. With the assistance provided by the cone packing components 104a-d, the cap 102 and the housing 101 are designed to form an leak resistant chamber 105 for the plunger assembly 100 to function properly. As shown in FIG. 2, the plunger 103 can be configured to move reciprocally along a central axis (indicated as an arrow A) of the housing 101. However, during operation, the cone packing components 104a-d can be extruded outside the leak resistant chamber 105 (i.e., forming an extrusion 201) due to the movement of the plunger 103, as illustrated in FIG. 2. The extrusion 201 may cause malfunction of the plunger assembly 100, which may include increased leakage through a leak path. Therefore, an improved sealing system or method is desirable.

SUMMARY

The technology of the present application is directed to an improved shaft or plunger assembly and associated method for sealing a shaft or plunger. The shaft or plunger assembly can include a shaft or plunger, a housing to accommodate the shaft or plunger, at least one sealing component positioned inside the housing and next to the shaft, and a rigid component fixedly attached to the sealing component. The rigid component can be positioned on the sealing component and in contact with the housing (or the cap), so as to prevent the sealing component from extruding out of the housing (or the cap) when the shaft or plunger moves relatively to the housing.

The technology of the present application also discloses a method of manufacturing a sealing assembly for facilitating sealing a shaft or plunger assembly. The shaft or plunger assembly can include a housing and a shaft or plunger positioned therein. The shaft or plunger can move reciprocally relative to the housing. The sealing assembly can include at least one sealing component and a corresponding rigid component fixedly attached to the sealing component. The method of manufacturing the sealing assembly can include: forming the sealing component made of a first elastic material; cleaning a contact surface of the sealing component at least by a degreasing process; applying an adhesive to the contact surface; positioning the sealing component into a mold; forming the rigid component in the mold by injecting a second elastic material with a greater rigidity than the first elastic material; and fixedly attaching the rigid component and the sealing component on the contact surface through a compression molding process.

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

These and other aspects of the present technology will be apparent after consideration of the Detailed Description and Drawings herein.

DRAWINGS

Non-limiting and non-exhaustive embodiments of the present invention, including the preferred embodiment, are described with reference to the following figures, wherein like reference numerals refer to like parts throughout the various views unless otherwise specified.

FIG. 1 illustrates a shaft assembly with traditional sealing components.

FIG. 2 further illustrates the shaft assembly described in FIG. 1.

FIG. 3 illustrates a shaft assembly in accordance with an exemplary embodiment of the present technology.

FIG. 4b is a side view of the rigid component described in FIG. 4a.

FIG. 5a is a side view of a rigid component and a sealing component in accordance with an exemplary embodiment of the present technology.

FIG. 5b is a side view of a rigid component and a sealing component in accordance with another exemplary embodiment of the present technology.

FIG. 5c is a side view of a rigid component and a sealing component in accordance with yet another exemplary embodiment of the present technology.

FIG. 5d is a side view of a rigid component and a sealing component in accordance with still another exemplary embodiment of the present technology.

FIG. 7 is a flowchart depicting a method in accordance with an exemplary embodiment of the present technology.

FIG. 8 is a flowchart depicting a method in accordance with an exemplary embodiment of the present technology.

DETAILED DESCRIPTION

Figure 1:
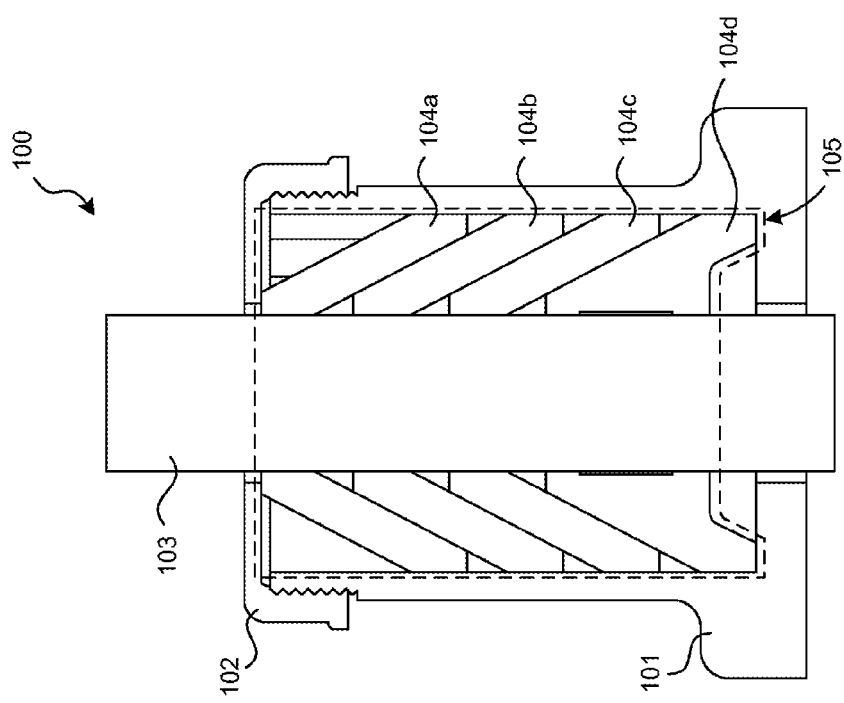

The technology of the present application is described with specific reference to shaft or plunger assemblies with an improved sealing mechanism. The shaft or plunger assemblies are described herein in connection with pump or value systems, but the seal assemblies can be used in other systems having a reciprocating shaft that needs to be sealed. The technology will be described with reference to methods of sealing shaft or plunger assemblies or to methods of manufacturing improved sealing assemblies. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

FIG. 3 illustrates a shaft assembly 300 in accordance with an exemplary embodiment of the present technology. As shown in FIG. 3, the shaft assembly 300 can include a housing (or a gland) 301, a cap 302, a shaft 303, four sealing components 304a, 304b, 304c, and 304d, (sometimes referred to as sealing rings) and rigid components 306a, 306b, 306c, and 306d. In other embodiments, the numbers of the sealing components 304 and corresponding rigid components 306 can vary depending on different designs. In certain aspects, only the sealing component 304a proximal the cap 302 will have a rigid component 306a (or insert). In FIG. 3, at least a portion of the shaft 303 can be positioned inside the housing 301. The shaft 303 can be configured to move reciprocally along a central axis (indicated as an arrow B) of the housing 301. The cap 302 can be fixedly connected to the housing 301 so as to create leak resistant chamber 305. Maintaining a leak resistant status of the leak resistant chamber 305 while the shaft 303 moves reciprocally plays an important role to allow the shaft assembly 300 to function properly. The sealing components 304a-d and the rigid components 306a-d together facilitate a proper sealing of the shaft assembly 300 without allowing any undesired extrusion of the sealing components. To maintain the leak resistance of the leak resistant chamber 305, generally the rigid component 306a-d is not in contact with the shaft 303 as a piece of the sealing component 304a-d resides between the rigid component and the shaft.

The sealing components 304a-d can be positioned inside the housing 301 and around the shaft 303. In this exemplary embodiment, the sealing components 304a-d can be cone packing sealing components. In other embodiments, the sealing components 304a-d can have other suitable shapes depending on various designs. The rigid components 306a, 306b, 306c, and 306d can be fixedly attached with, or bonded to, the corresponding sealing components 304a-d respectively. In the exemplary embodiment shown in FIG. 3, the rigid components 306a-d are fixedly attached to the sealing components 304a-d by adhesives. In other embodiments, the rigid components 306a-d can be fixedly attached with the corresponding sealing components 304a-d by glue, mechanical mechanisms (e.g., cross-linked), or other suitable means.

The sealing components 304a-d and rigid components 306a-d can be made of (or from) any suitable elastic material that can be split, deflected, or opened when a proper force is applied thereon and then can return back to its original shape/position when the force no longer exists. The rigid components 306a-d can have higher rigidity (or lower elasticity) than the sealing components 304a-d. In other words, when a proper force applies, the rigid components 306a-d would have a much less or even negligible deformation than the sealing components 304a-d.

The sealing components 304a-d and the rigid components 306a-d can be made of (or from) plastic materials, reinforced materials, compounded fibers, polymer materials, or other suitable materials. In some embodiments, the rigid components 306a-d can be made of (or from) a material with greater rigidity than the sealing components 304a-d. In some embodiments, the rigid components 306a-d can be made of (or from) a 6-6 nylon material, while the sealing components 306a-d can be made of (or from) a material with lesser rigidity than the 6-6 nylon material. In other embodiments, the sealing components 304a-d can be made of (or from) a rubber material, while the rigid components 306a-d can be made of (or from) a 6-6 nylon material being 30% glass-filled nylon material. Other reinforcing fibers are usable as well, such as, for example, graphite fibers, carbon fibers, ceramic fibers, and the like.

As shown in FIG. 3, the rigid component 306a is in contact with the cap 302. Similarly, when multiple rigid components are used, the rigid component 306b is in contact with the sealing component 304a, the rigid component 306c is in contact with the sealing component 304b, and the rigid component 306d is in contact with the sealing component 304c. As shown in FIG. 3, the sealing components 304a-d are in contact with the shaft 303. Therefore, when the shaft 303 moves, the shaft 303 can cause, at least to some extent, the sealing components 304a-d to move with the shaft 303 due to the surface friction between the shaft 303 and the sealing components 304a-d. At this time, the rigid component 306a can prevent (or restrain) the sealing component 304a from extruding outside the cap 302 caused by the movement of the shaft 303. The rigid component 306b-d can provide similar effects to the sealing components 304b-d.

As shown in FIG. 3, the sealing component 304d can further define a recess 307 on a side (e.g., the lower side of the sealing component 304d) opposite to the rigid component 306d (which is positioned on the upper side of the sealing component 304d). The recess 307 can provide a buffer zone for the sealing component 304d to deform when the shaft 303 moves downwardly (as orientated and viewed on the figure), so as to prevent the sealing component 304d from extruding outside the housing 301.

With the assistance provided by the sealing components 304a-d and the rigid components 306a-d, the cap 302 and the housing 301 can maintain the leak resistant status of the leak resistant chamber 305, which allows the shaft assembly 300 to function properly. Those skilled in the art would appreciate that, in other embodiments, the leak resistant chamber 305 can be in other suitable shapes and that the leak resistant chamber 305 can be formed by the housing 303 (with the sealing components 304 and the rigid components 306) without the cap 302. Also, while maintained as a leak resistant chamber 305, the leak resistant chamber 305 may, in certain embodiments, be hermetic or fluid impervious.

Figure 4A:
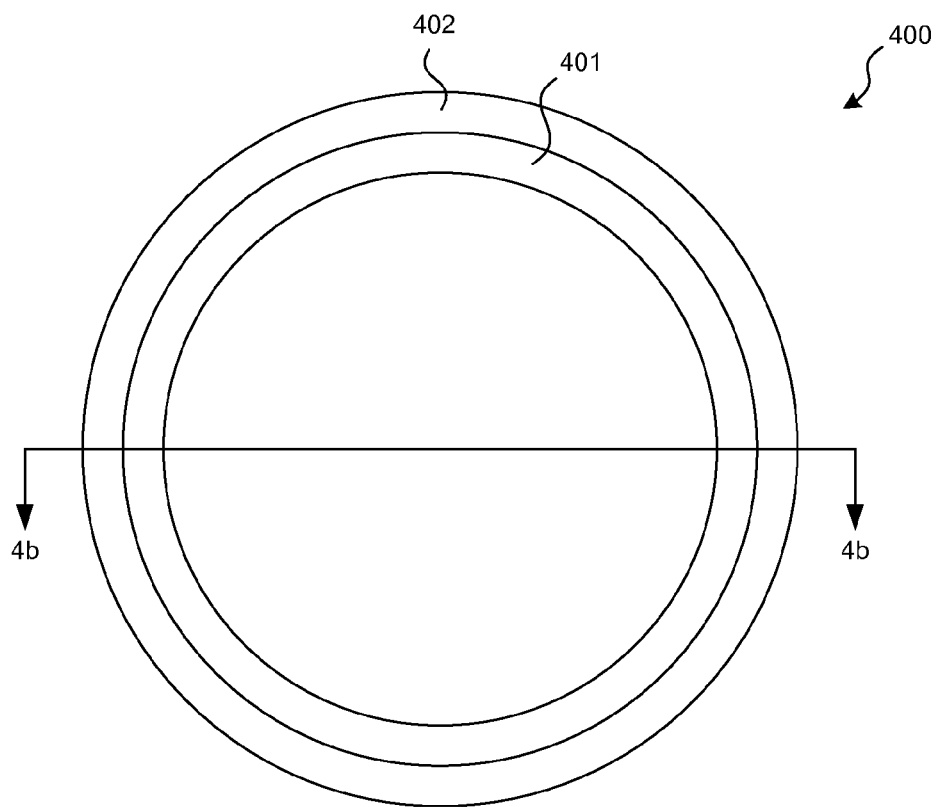
FIG. 4a is a top view of a rigid component in accordance with an exemplary embodiment of the present technology.
Figure 4B:
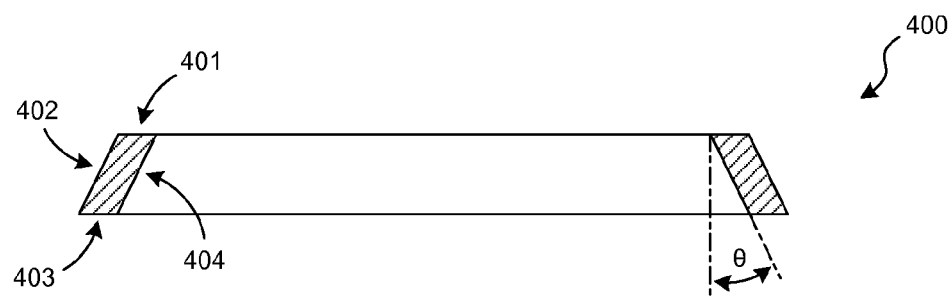

FIG. 4a and FIG. 4b are a top view and a side view of a rigid component 400 in accordance with an exemplary embodiment of the present technology. As used in the description, the designation of top, side, bottom, etc., is provided with regard to orientation and the designations should not be considered limiting. As shown in FIGS. 4a and 4b, the rigid component 400 can have a top surface 401, an outer surface 402, a bottom surface 403, and an inner surface 404. The designation of top, bottom, inner and outer relate to as installed with relation to the cap 302. Referring to the exemplary embodiment shown in FIG. 4b, the top surface 401 can be parallel to the bottom surface 403, and the outer surface 402 can be parallel to the inner surface 404. In other embodiments, the top surface 401 does not need to be parallel to the bottom surface 403, and the outer surface 402 does not need to be parallel to the inner surface 404. In one embodiment, the bottom surface 403 and the inner surface 404 can be used to fixedly attach with a corresponding sealing component (e.g., one of the sealing components 304a-d, not shown in FIG. 4b). As shown in FIG. 4b, the inner surface 404 can form an angle θ with a surface perpendicular to the top surface 401 (or the bottom surface 403). In some embodiments, the angle θ can be around 20-30 degree. In one embodiment, the angle θ can be around 25.75 degree.

In some embodiments, the bottom surface 403 and the inner surface 404 can be shaped (e.g., through a cutting process or a machining process) or formed (e.g., through a molding process) based on corresponding surfaces of the sealing components. For example, the bottom surface 403 and the inner surface 404 can include protrusions (not shown) designed to be accommodated by corresponding openings (not shown) positioned on the corresponding sealing component, so as to fixedly attach the rigid component 400 with the corresponding sealing component. In some embodiments, the bottom surface 403, the inner surface 404, and the outer surface 402 may be encompassed by the sealing component. In other embodiments, the rigid component 400 can have other suitable shapes. For example, in one embodiment, the rigid component 400 can be in an annular shape.

FIG. 5a is a side view of a rigid component 501 and a sealing component 502 in accordance with an exemplary embodiment of the present technology. The rigid component 501 can have a radial thickness (annotated as C in FIG. 5a) less than the thickness of the sealing component 502 (annotated as D in FIG. 5a). In one embodiment, the radial thickness ratio (C/D) of the rigid component 501 to the sealing component 502 can be around 0.25. In other embodiments, the thickness ratio of the rigid component 501 to the sealing component 502 can range from 0.1 to 0.9 depending on different designs. The rigid components 501 can be fixedly attached with or bonded to the sealing components 502 by glue, adhesives, mechanical mechanisms (e.g., cross-linked), or other suitable means.

FIG. 5b is a side view of a rigid component 503 and a sealing component 504 in accordance with another exemplary embodiment of the present technology. As shown in FIG. 5b, the rigid component 503 can be fixedly attached to the sealing component 504 by only a portion of its bottom surface 5031 and a portion of its inner surface 5032. FIG. 5c is a side view of a rigid component 505 and a sealing component 506 in accordance with yet another exemplary embodiment of the present technology. As shown in FIG. 5c, the rigid component 505 can be fixedly attached to the sealing component 506 by a portion of the upper surface 5061 of the sealing component 506.

FIG. 5d is a side view of a rigid component 507 and a sealing component 508 in accordance with still another exemplary embodiment of the present technology. As shown in FIG. 5d, the rigid component 507 can have a hexagonal cross-section. In this exemplary embodiment, the shape of the sealing component 508 is in accordance with the shape of the rigid component 507. In some embodiments, the rigid component 507 can have a polygonal cross-section. In other embodiments, the rigid component 507 can have an irregular cross-section.

FIGS. 5b and 5d show versions where the top surface of the rigid component 503, 07 extend beyond the sealing component. Generally, the top surface of the rigid component should coincide with the top surface of the sealing component.

Figure 6:
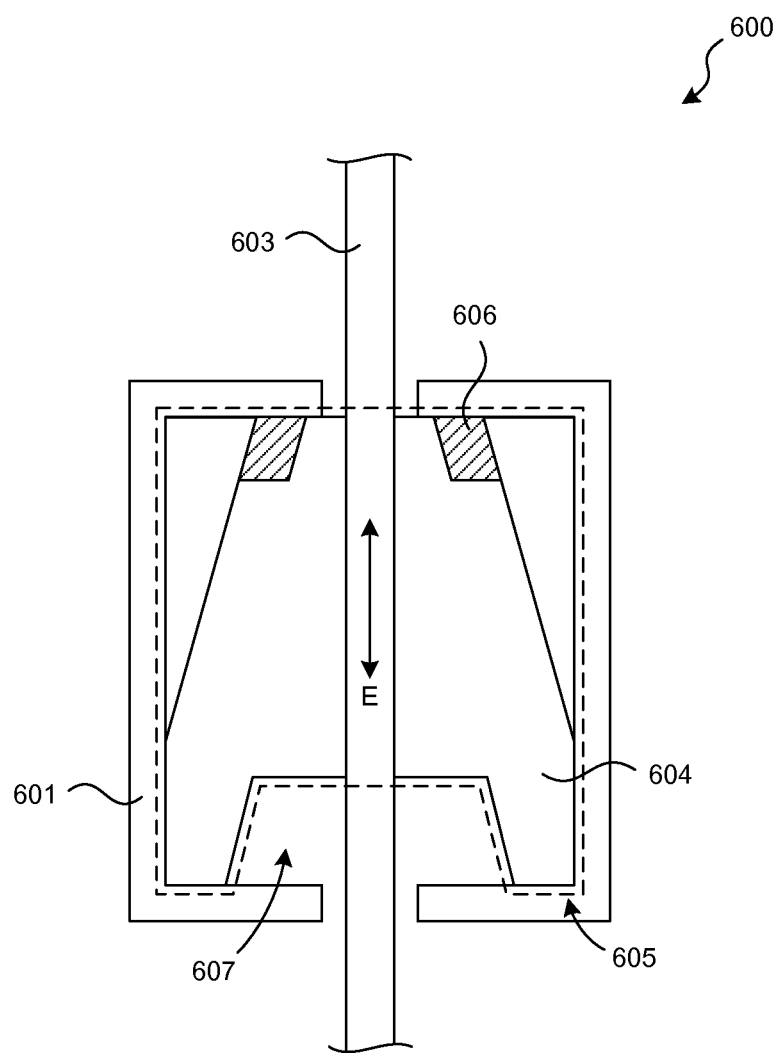
FIG. 6 illustrates a shaft assembly in accordance with another exemplary embodiment of the present technology.

FIG. 6 illustrates a plunger assembly 600 in accordance with another exemplary embodiment of the present technology. As shown in FIG. 6, the plunger assembly 600 can include a housing (or a gland) 601, a plunger 603, a sealing component 604, and a rigid component 606. At least a portion of the plunger 603 can be positioned inside the housing 601. The plunger 603 can be configured to move reciprocally along a central axis (indicated as an arrow E) of the housing 601. The housing 601, the sealing component 604, and the rigid component 606 together form a leak resistant chamber 605. The sealing component 604 can be positioned inside the housing 301 and around the plunger 603. The sealing component 604 can be fixedly attached with or bonded to the rigid component 606. The sealing component 604 can further define a recess 607 on a side (e.g., the lower side of the sealing component 604) opposite to the rigid component 606 (which is positioned on the upper side of the sealing component 604).

Maintaining the leak resistant status of the leak resistant chamber 605 while the plunger 603 moves reciprocally plays an important role to allow the plunger assembly 600 to function properly. The sealing component 604 and the rigid component 606 together facilitate properly sealing the plunger assembly 600 without causing any undesired extrusion of the sealing component 604. In this exemplary embodiment, the sealing component 604 can be a cone packing sealing component. In other embodiments, the sealing component 604 can have other suitable shapes depending on various designs.

In the exemplary embodiment shown in FIG. 6, the rigid component 606 is fixedly attached to the sealing component 604 by adhesives. In other embodiments, the rigid component 606 can be fixedly attached with the sealing component 604 by glue, mechanical mechanisms (e.g., cross-linked), or other suitable means. The rigid component 606 can have higher rigidity (or lower elasticity) than the sealing component 604. The sealing component 604 and the rigid component 606 can be made of (or from) plastic materials, reinforced materials, compounded fibers, polymer materials, or other suitable materials.

As shown in FIG. 6, the rigid component 606 is in contact with the housing 601 (e.g., the upper part of the housing 601). The sealing component 604 is in contact with the plunger 603. Therefore, when the plunger 603 moves upwardly, the sealing component 604 can move, at least to some extent, upwardly due to the surface friction between the plunger 603 and the sealing component 604. When the plunger 603 moves upwardly, the rigid component 606 can prevent (or restrain) the sealing component 604 from forming an extrusion outside the housing 601 caused by the upward movement of the plunger 603. When the plunger 603 moves downwardly, the recess 607 defined by the sealing component 604 can provide a buffer zone for the sealing component 604 to deform, so as to prevent the sealing component 604 from extruding outside the housing 601. With the assistance provided by the sealing component 604 and the rigid component 606, the housing 601 can maintain the airtight status of the airtight chamber 605, which allows the plunger assembly 600 to function properly. Those of skilled in the art would appreciate that, in other embodiments, the airtight chamber 605 can be in other suitable shapes.

With reference to FIG. 7, a flowchart depicting a method 700 in accordance with an exemplary embodiment of the present technology is disclosed. The method 700 is directed to a method of sealing a shaft or a plunger assembly. The method 700 can start at block 701 by positioning the shaft inside a housing along a center axis of the housing. The shaft can be reciprocally moved relative to the housing.

The method 700 can then continue to block 702 by fixedly attaching a rigid component with a sealing component on an upper surface of the sealing component. The rigid component has a greater rigidity than the sealing component. In some embodiments, the rigid portion can include a top surface, a bottom surface, an inner surface and an outer surface. In some embodiments, the top surface can be parallel to the bottom surface and the inner surface can be parallel to the outer surface. The sealing component can further define a recess on its lower surface.

At block 703, the method 700 can proceed by positioning the sealing component and the rigid component around the shaft inside the housing through at least partially splitting the sealing component. This arrangement allows an easy installation of the sealing component without disassembling the whole shaft assembly. At block 704, the method 700 can proceed by attaching a cap with the housing, so as to allow the rigid component to contact with the cap. In other embodiments, the cap can be a part of the housing.

At block 705, the method 700 can end by forming a leak resistant chamber by the cap, the sealing component, the rigid component, and the housing. The leak resistant chamber is used to prevent the sealing component from extruding outside the cap (or the housing) when the shaft moves relatively to the housing (e.g., upwardly or downwardly).

In other embodiments, the method 700 can further include a step of preventing the sealing component from extruding outside the housing by the recess when the shaft moves relatively to the housing. The recess can provide a buffer zone for the sealing component to deform when the shaft moves relatively, so as to prevent the sealing component from extruding outside the housing (or the cap).

FIG. 8 is a flowchart depicting a method 800 in accordance with an exemplary embodiment of the present technology. The method 800 relates to a method of manufacturing a sealing assembly for facilitating sealing a shaft or a plunger assembly. The sealing assembly can include a sealing component and a rigid component. The shaft assembly can include a housing and a shaft positioned to be moved reciprocally relative to the housing. With reference to FIG. 8, the method 800 can start at block 801 by forming the sealing component made of a first elastic material. The sealing component can be made of (or from) any suitable elastic material that is able to be split, deflected, or opened when a force is applied thereon and then can return back to its original shape or position when the force no longer exists. The rigid component has higher rigidity (or lower elasticity) than the sealing component. The sealing components and the rigid components can be made of (or from) plastic materials, reinforced materials, compounded fibers, polymer materials, or other suitable materials. For example, in one exemplary embodiment, the sealing component is formed from rubber and the rigid component is formed from 6-6 30% glass-filled nylon.

The method 800 can then continue to block 802 by cleaning a contact surface of the sealing component at least by a degreasing (or cleaning) process. The contact surface of the sealing component can be used to fixedly attach with the rigid component. Removing undesired particles, dust, or grease on the contact surface before attachment provides a better bounding result between the sealing component and the rigid component. At block 803, the method 800 can proceed by applying an adhesive to the contact surface. In other embodiments, the sealing component and the rigid component can be fixedly attached by glue, mechanical mechanisms (e.g., cross-linked), or other suitable means.

At block 804, the method 800 can proceed by positioning the sealing component into a mold. The purpose of using a molding process is to create a rigid component with a corresponding contact surface that substantively matches the contact surface of the sealing component. In other embodiments, the rigid component can be made by any other suitable means (e.g., a cutting or machining process). At block 805, the method 800 can proceed by forming the rigid component in the mold by injecting a second elastic material. Using the second elastic material with greater rigidity in the mold results in the rigid component with greater rigidity than the sealing component.

At block 806, the method 800 can end by fixedly attaching the rigid component and the sealing component on the contact surface of the sealing component through a compression molding process. As discussed above, the compression molding process can create a rigid component that substantially matches the sealing component. The attached sealing component and the rigid component together form the sealing assembly that facilitates the shaft assembly to create an airtight chamber without accidental extrusion of the sealing component outside the shaft assembly.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A shaft assembly, comprising:
   a housing;
   a cap connected to the housing;
   a shaft, at least a portion of the shaft being operably positioned inside the housing;
   a first sealing component contacting with the housing and the shaft;
   a rigid component fixedly attached with the first sealing component and in contact with the cap; and
   a second sealing component contacting with the housing, the shaft, and the first sealing component; and
   wherein the housing, the cap, the first sealing component, and the second sealing component together define a leak resistant chamber.

2. The shaft assembly of claim 1, wherein the rigid component is a first rigid component and the first rigid component has a first inner surface contacting with the first sealing component, and wherein the shaft assembly further comprises a second rigid component having a second inner surface contacting with the second sealing component.

3. The shaft assembly of claim 2, wherein the first rigid component has less elasticity than the first sealing component.

4. The shaft assembly of claim 2, wherein the second rigid component has less elasticity than the second sealing component.

5. The shaft assembly of claim 2, wherein the second rigid component includes a top surface, a bottom surface, an inner surface and an outer surface, and wherein the top surface is parallel to the bottom surface and the inner surface is parallel to the outer surface.

6. The shaft assembly of claim 1, wherein the first sealing component includes a first cone packing component, and wherein the second sealing component includes a second cone packing component.

7. The shaft assembly of claim 1, wherein the rigid component includes a top surface, a bottom surface, an inner surface and an outer surface, and wherein the top surface is parallel to the bottom surface and the inner surface is parallel to the outer surface.

8. The shaft assembly of claim 1, wherein the rigid component is made from plastic.

9. The shaft assembly of claim 1, wherein a radial thickness ratio of the rigid component to the sealing component is around 0.25.

10. An apparatus for sealing a plunger, comprising:
a housing, wherein at least a portion of the plunger is positioned inside the housing;
a top sealing component contacting with the housing and the plunger;
a first rigid component fixedly attached with the top sealing component and in contact with the housing;
a bottom sealing component contacting with the housing, the plunger, and the top sealing component;
a second rigid component fixedly attached with the bottom sealing component; and
wherein the housing, the top sealing component, and the bottom sealing component together define a leak resistant chamber.

11. The apparatus of claim 10, wherein the first rigid component has a first inner surface contacting with the top sealing component, and wherein the second rigid component has a second inner surface contacting with the bottom sealing component.

12. The apparatus of claim 10, wherein the first rigid component has less elasticity than the top sealing component.

13. The apparatus of claim 10, wherein the second rigid component has less elasticity than the bottom sealing component.

14. The apparatus of claim 10, wherein the sealing components include at least one cone packing component.

15. The apparatus of claim 10, wherein the first rigid component includes a top surface, a bottom surface, an inner surface and an outer surface, and wherein the top surface is parallel to the bottom surface and the inner surface is parallel to the outer surface.

16. The apparatus of claim 10, wherein the second rigid component includes a top surface, a bottom surface, an inner surface and an outer surface, and wherein the top surface is parallel to the bottom surface and the inner surface is parallel to the outer surface.

17. The apparatus of claim 10, wherein a radial thickness ratio of the rigid component to the sealing component is around 0.25.

18. A method of sealing a shaft, comprising:
positioning the shaft inside a housing along a center axis of the housing;
fixedly attaching a rigid component with a sealing component on an upper surface of the sealing component, wherein a recess is defined by a lower surface of the sealing component;
positioning the sealing component and the rigid component around the shaft through at least partially splitting the sealing component;
attaching a cap with the housing, so as to allow the rigid component to contact with the cap; and
forming a leak resistant chamber by the cap, the sealing component, the rigid component, and the housing, so as to prevent the sealing component from extruding outside the cap when the shaft moves relatively to the housing.

19. The method of claim 18, further comprising preventing the sealing component from extruding outside the housing by the recess when the shaft moves relatively to the housing.

20. The method of claim 18, wherein the rigid component includes a top surface, a bottom surface, an inner surface and an outer surface, and wherein the top surface is parallel to the bottom surface and the inner surface is parallel to the outer surface.

* * * * *